(12) United States Patent
Spillman

(10) Patent No.: US 6,848,785 B1
(45) Date of Patent: Feb. 1, 2005

(54) SAFETY GLASSES AND ATTACHED READING GLASSES

(76) Inventor: Leslie R. Spillman, 1411 NE. 65th St., Vancouver, WA (US) 98665

( * ) Notice: Subject to any disclaimer, the term of this patent is extended or adjusted under 35 U.S.C. 154(b) by 0 days.

(21) Appl. No.: 10/669,344

(22) Filed: Sep. 25, 2003

(51) Int. Cl.[7] .................................................. G02C 7/08
(52) U.S. Cl. ......................................................... 351/57
(58) Field of Search .............................. 351/47, 48, 57, 351/58; D16/900

(56) References Cited

U.S. PATENT DOCUMENTS

| 712,616 A | * | 11/1902 | Strassburger | ................. 351/57 |
|---|---|---|---|---|
| 1,786,204 A | | 12/1930 | Gravitt | ......................... 351/57 |
| 3,379,487 A | | 4/1968 | Amundsen | ................... 351/57 |
| 4,929,075 A | * | 5/1990 | Eliakim | ...................... 351/158 |
| 5,118,178 A | * | 6/1992 | Tuckman | ..................... 351/57 |
| 5,469,229 A | | 11/1995 | Greenbaum | .................. 351/44 |
| 5,598,232 A | * | 1/1997 | Pronesti | ....................... 351/54 |
| 6,178,561 B1 | | 1/2001 | Cheng | ............................. 2/13 |

* cited by examiner

Primary Examiner—Huy Mai
(74) Attorney, Agent, or Firm—Brady, O'Boyle & Gates

(57) ABSTRACT

Safety glasses and attached reading glasses in which the reading glasses are pivotally connected to a support member which is pivotally connected to the safety glasses so that the reading glasses can not only be pivoted to an out-of-the way position from in front of the safety glasses when not needed, but also pivoted relative to the front of the safety glasses to provide better focus.

4 Claims, 2 Drawing Sheets

SAFETY GLASSES AND ATTACHED READING GLASSES

BACKGROUND OF THE INVENTION

Industrial plant workers, such as machinists, are required to wear safety glasses to prevent metal chips and other debris from damaging their eyes. Often times the worker has a need for reading glasses while working, which would require the removal of the safety glasses, resulting in a violation of safety standards.

After considerable research and experimentation, the safety glasses and attached reading glasses of the present invention has been devised wherein reading glasses are pivotally connected to safety glasses, whereby the reading glasses can not only be pivoted to an out-of-the-way position from in front of the safety glasses when not needed, but also pivoted relative to the front of the safety glasses to allow better focus.

SUMMARY OF THE INVENTION

The safety glasses and attached reading glasses of the present invention comprises, essentially, conventional safety glasses having temples for engaging the wearer's ears. A bowed wire support extends across the front of the safety glasses and is pivotally connected at each end to the side portions of the safety glasses, and a pair of reading glasses are pivotally mounted on the medial portion of the bowed wire.

By this construction and arrangement, the bowed wire and attached eye glasses can be pivoted in one direction to move the eye glasses in front of the safety glasses when needed or in the opposite direction away from the front of the safety glasses when not needed. The reading glasses can also be pivoted about the bowed wire to move the glasses out of the line of sight or to allow better focus.

DETAILED DESCRIPTION OF THE INVENTION

Figure 1:
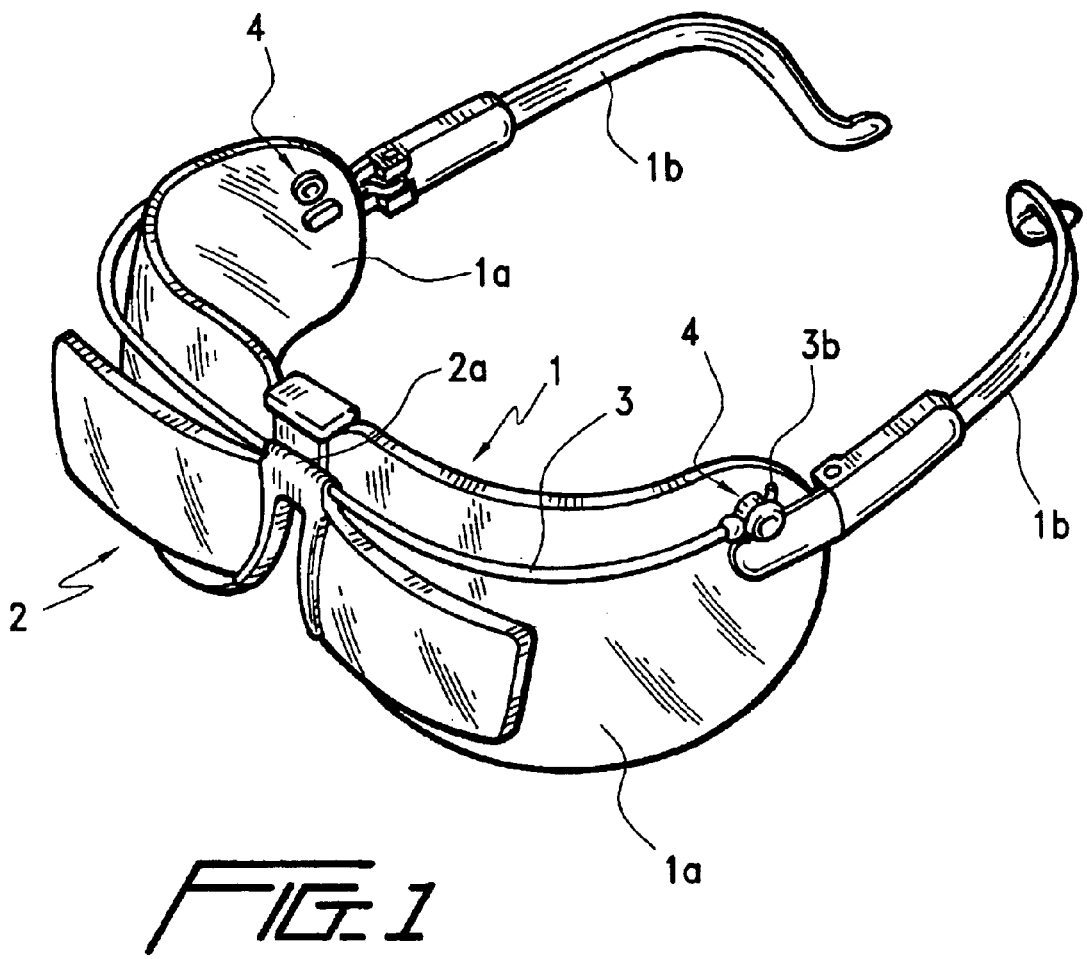
FIG. 1 is a perspective view of the safety glasses and attached reading glasses of the present invention.

Referring to the drawings and more particularly to FIG. 1, conventional safety glasses 1 are shown having eye shields or pieces 1a of plain glass or plexiglass, and temples 1b for engaging the ears of a wearer. Reading glasses 2 are pivotally connected as at 2a to a bowed wire support member 3 extending across the safety glasses 1 and pivotally connected at each end thereof, as at 4, to the side portions of the safety glasses 1.

Figure 5:
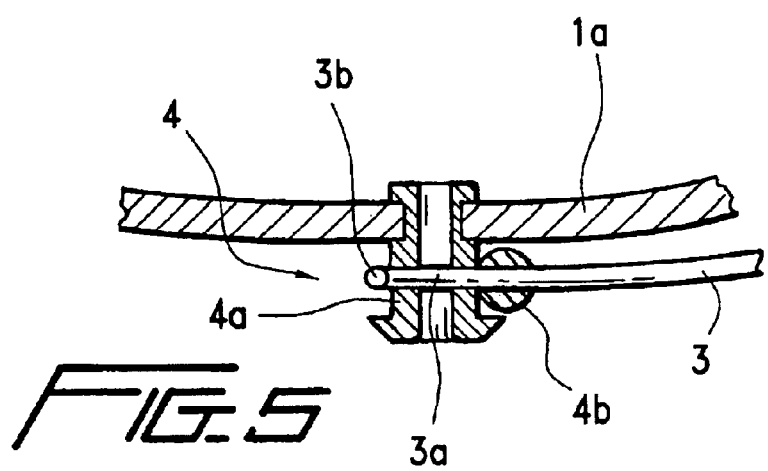

The details of the construction of the pivotal connection 4 are illustrated in FIG. 5, wherein a stub shaft 4a extends through the side portion 1a of the safety glasses and is rotatably mounted therein with a friction fit. The end portion 3a of the bowed wire extends transversely through the stub shaft 4a with the end 3b of the wire 3 bent upwardly to thereby fasten the bowed wire 3 to the stub shaft 4a. Before inserting the end portion 3a of the wire through the stub shaft 4a, a bead 4b is slid onto the end part 3a of the wire 3 and is positioned at a predetermined distance from the end of the wire, whereby the bead 4b abuts the side of the stub shaft 4a when the end portion 3b of the wire is bent upwardly. By this construction and arrangement, the wire 3 is maintained at a desired distance spaced outwardly from the safety glasses 1.

Figure 2:
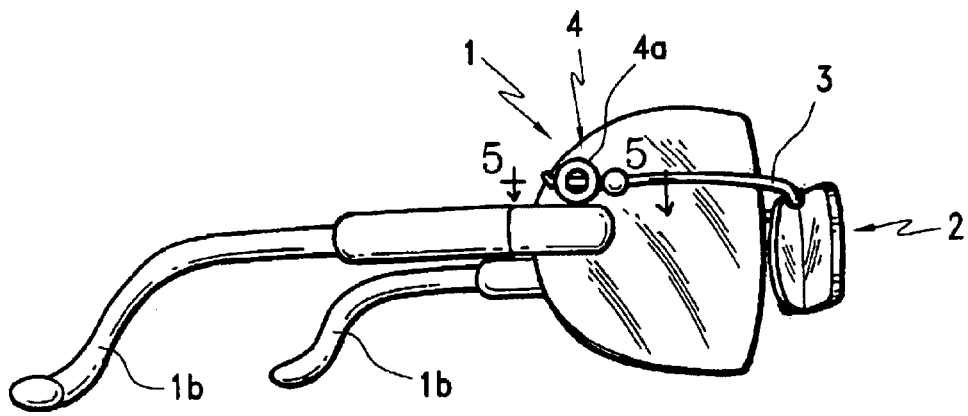
FIG. 2 is a side elevational view showing the reading glasses in the operative position in front of the safety glasses.
Figure 3:
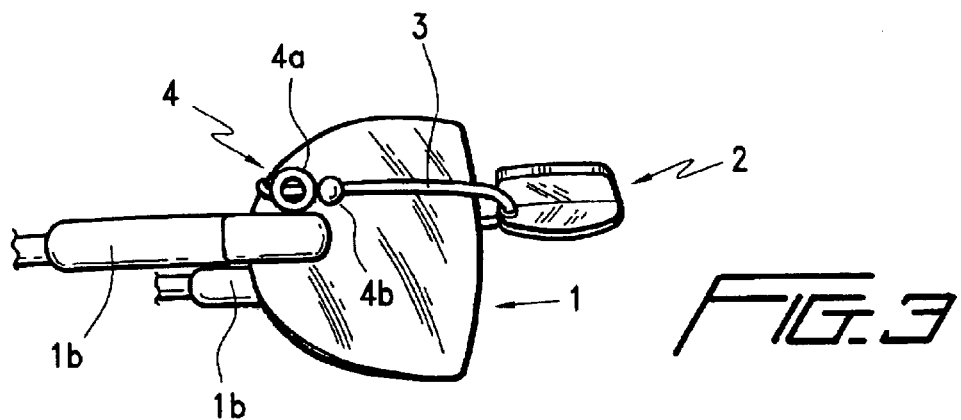
FIG. 3 is a side elevational view showing the reading glasses pivoted about the bowed wire to an inoperative position.
Figure 4:
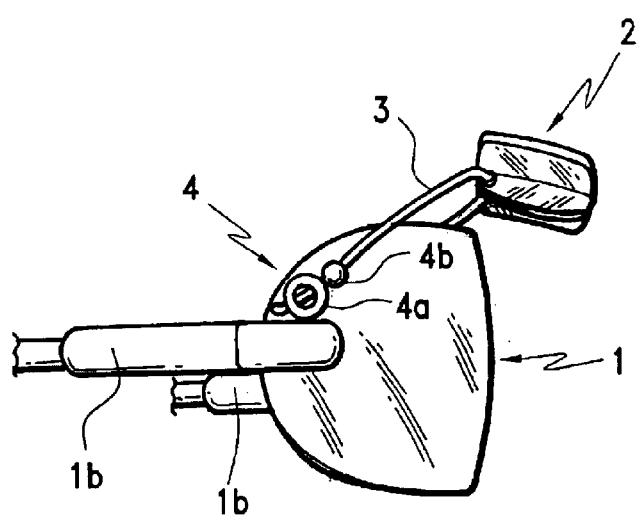
FIG. 4 is a side elevational view showing the bowed wire and associated reading glasses pivoted to an out-of-the-way position from the safety glasses; and, FIG. 5 is a view taken along line 5—5 of FIG. 2.

The operation of the safety glasses and attached reading glasses is illustrated in FIGS. 2, 3 and 4, wherein it will be seen in FIG. 2 that the reading glasses 2 can be positioned in front of the safety glasses 1 so that the worker will have the benefit of the reading glasses 2 to better see the work piece, while simultaneously having eye protection afforded by the safety glasses 1.

If the reading glasses 2 are no longer needed or a better focus is needed, the reading glasses 2 can be pivoted about the wire 3 relative to the safety glasses 1, as shown in FIG. 3.

If the reading glasses 2 are not needed, they can be moved to an out-of-the way position, as shown in FIG. 4, by pivoting the wire about the pivotal connections 4.

From the above description, it will be appreciated by those skilled in the art that the safety glasses and attached reading glasses of the present invention provide an improved eye shield and vision enhancer which not only protects the eyes of the wearer, but also improves the focus of the eyes.

I claim:

1. In combination, safety glasses and attached reading glasses, said safety glasses comprising eye shields having side portions and temples connected to said side portions, for engaging a wearer's ears, a support member having opposite end positions, means for pivoting each end portion of said support member to respective side portions of said eye shields, said support member being spaced outwardly from the front of said eye shields, and reading glasses pivotally connected to the medial portion of said support member, whereby the support member and reading glasses can be either pivoted to an out-of-the way position from the front of the safety glasses or the reading glasses can be pivoted about the support member in front of the safety glasses to provide enhanced focus for the wearer.

2. The combination of claim 1, wherein the support member comprises a bowed wire.

3. The combination of claim 2, wherein the means for pivoting each end of the support member to the side portions of the eye shields comprises, a stub shaft extending through respective side portions of the eye shields, and each end of said bowed wire extending transversely through the side of a respective stub shaft.

4. The combination of claim 3, wherein a bead is mounted on each end portion of the bowed wire, the portion of the bowed wire extending through a side of the stub shaft being bent, to thereby cause the bead to abut the opposite side of the respective stub shaft, whereby the bowed wire is maintained at a predetermined distance spaced outwardly in fromt of the safety glasses.

* * * * *